Aug. 24, 1926.
M. J. McTIGHE
1,597,092
TOOL CONTAINER
Filed April 20, 1925
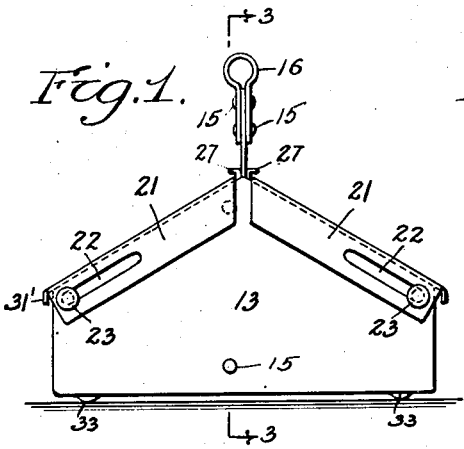
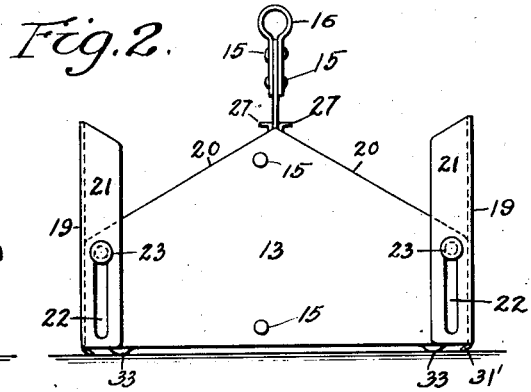
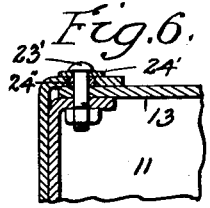
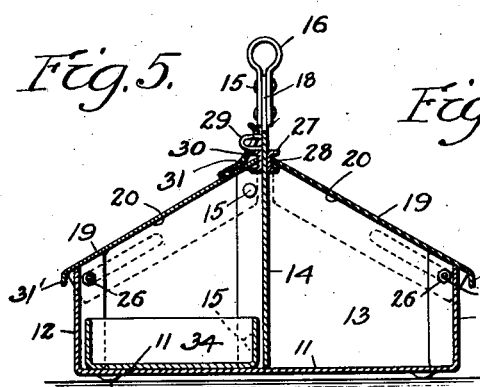
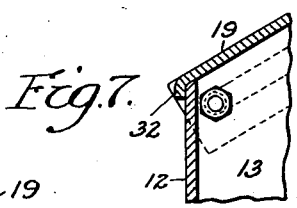
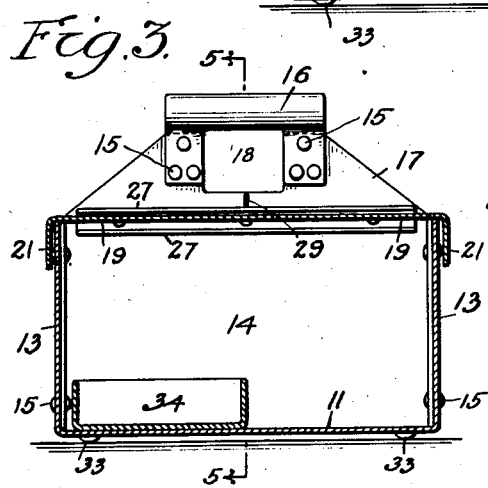
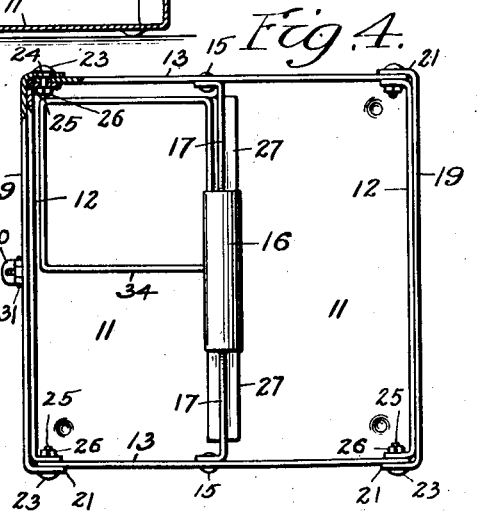
INVENTOR
MAURICE J. McTIGHE
By *L. A. Graham*
ATTORNEY Patented Aug. 24, 1926.

1,597,092

UNITED STATES PATENT OFFICE.

MAURICE J. McTIGHE, OF PASADENA, CALIFORNIA.

TOOL CONTAINER.

Application filed April 20, 1925. Serial No. 24,584.

My present invention being referred to as a tool container, it may be understood to be an object of this invention to provide a carrying box of rugged construction, suitable for use by garage mechanics, plumbers, and the like, but not limited to the particular uses suggested.

It is an object of this invention to provide a tool container adapted to be inexpensively constructed from heavy sheet metal, or the like, and provided with a suitable upstanding handle rigidly connected therewith, this handle being optionally formed also of sheet metal and integral with or secured to a central partition element, by which my container may be subdivided and reinforced.

It is a further and important object of this invention to provide a tool container comprising a pair of cover elements secured by pin-and-slot connections and adapted to be swung either into a closed position, in which said cover elements may be retained by gravity or secured by a lock, or into an open position, in which they are not only out of the way but actually serviceable as side boards, substantially increasing the capacity of my box as the same may be used (in an open condition) in the transport of tools and materials to and from a job.

Other objects of my invention may be best understood from the following description of an illustrative embodiment thereof, taken in connection with the appended claims and the accompanying drawings, in which—

Fig. 1 is an end elevational view showing one of my tool containers as closed.

Fig. 2 is a similar view, but showing the same as having both sides opened.

Fig. 3 is a sectional view, taken substantially as indicated by the line 3—3 of Fig. 1.

Fig. 4 is a top plan view, corresponding to Fig. 2, but with parts broken away to show a detail hereinafter referred to.

Fig. 5 is a vertical sectional view, taken substantially as indicated by the line 5—5 of Fig. 3.

Figs. 6 and 7 show alternative or optional details hereinafter referred to.

Referring to the details of that specific embodiment of my invention chosen for purposes of illustration, and mentioning at the outset that the dimensions and proportions of my tool containers may be varied within wide limits, a container substantially square in plan outline being selected merely for convenuience of illustration, the body of each of my containers or boxes may comprise a bottom 11 and sides 12 formed from, for example, a single piece of comparatively heavy sheet metal; and the elements referred to may be rectangular in outline and associated with end elements 13. Whether or not these end elements are formed, as I may prefer to form them, from the same piece of sheet metal, or the like, from which the mentioned bottom and sides are cut, they may be secured in their upturned relationship by means comprising a reinforcing partition 14, shown as secured thereto by rivets 15 and as comprising or carrying a handle 16 When this handle is formed of a separate fragment of the same or a similar sheet material, it may be secured to the reinforcing partition 14 by means such as rivets 15, both the upstanding exterior 17 of the partition 14 and the fragment from which the handle 16 is cut being apertured, as at 18, to provide an opening through which the fingers may extend, downwardly extending straps, for the rivets 15, being shown as contacting with opposite faces of the partition 14.

The respective ends 13 being highest at their centers or in the region of their contact with the reinforcing partition plate 14, I may extend thereover inclined cover plates 19 adapted to contact with the inclined upper edges 20 thereof; and the mentioned cover plates may advantageously be secured by means such as pin-and-slot connections. For example, I may provide each of the cover plates 19 with downwardly turned extensions or edges 21 adapted to overlie the respective ends 13; and I may provide the mentioned down-turned portions with slots 22, adapted to engage pins 23, shown as having heads exceeding in diameter the slots 22 and as secured at the upper, outer corners of the ends 13. As best shown in Fig. 4, the pins 23 may comprise, in addition to their enlarged heads, and in addition to rounded shanks 24 adapted to interfit with the slots 22, reduced threaded bodies 25, engageable by nuts 26; and, whether or not so formed, the pins 23 may serve not only to secure the mentioned cover elements 19 but also to fasten the sides 12 to the end elements 13 at the upper, outer corners thereof.

In order to strengthen the entire organization referred to and to provide for a comparatively tight closure for a tool container of the general character described, I may optionally secure angle or channel elements 27 to one or both sides of the reinforcing partition plate 14, in such manner that the upper edges 28 of the plates 19 may interfit with the channels thereof, as best shown in Figs. 3 and 5; and, in order to provide for the fastening of one or both of the covers 19 in a closed position I may provide a lock of any usual or preferred type, a mere staple 29 and a hasp 30, pivoted at 31, being suggested in Figs. 4 and 5 as suitable for use with an ordinary padlock, whether or not the hasp extends through opening 18.

Obviously, tool containers of the general character described may be made in any desired sizes, preferably of a non-rusting material or provided with a suitable coating; and the use of means such as the reinforcing elements 27 may be favorable to the exclusion of moisture therefrom, in case the same are exposed to wet weather. During the night, or during disuse, the covers 19 may normally remain closed and optionally locked; but, during working hours, the covers may normally occupy substantially the positions indicated in Fig. 2, thereby serving as side boards and contributing to the capacity of the container.

It will be obvious that the covers 19 may be retained by gravity either in their closed positions or in their open positions; and that, when they occupy their open positions, even comparatively long and irregular bodies may be supported and conveniently carried by means of my novel tool container.

Instead of providing special pivot pins or bolts 23, I may employ suitable rivets; or, as shown in Fig. 6, I may employ ordinary bolts 23', such as are obtainable at small cost, surrounding the same with washers 24' and 24", respectively adapted to interfit within and to extend over the slot 22; and, for the purpose of very completely excluding the weather and preventing any tampering, I consider it advantageous to bend the edges of the covers 20 downward, somewhat as shown at 31' in Fig. 5, or as shown at 32 in Fig. 7. Bosses 33, positioned as may be found suitable, may be employed to give my boxes a slight elevation, diminishing the danger of rust or corrosion; and any desired containers 34 may be specially constructed to interfit within a larger box constructed as described.

Although I have herein described a single complete embodiment of my invention, it will be understood that various features thereof may be independently employed, and also that various modifications might be made, by those skilled in the art to which this case relates, without the slightest departure from the spirit and scope of my invention, as the same is indicated above and in the following claims.

I claim as my invention:

1. A tool container comprising: a body substantially rectangular in horizontal outline and formed from sheet material, the ends of said body being highest at the center thereof and there connected by a reinforcing partition extending thereabove; and inclined covers having down-turned portions which extend over said ends and are retained by pins at the outer, upper corners thereof, said covers being adapted, when closed, to engage said reinforcing partition.

2. A tool container comprising: a body; a central reinforcing sheet metal partition extending from end to end thereof; and covers pivoted to said body near the upper, outer corners of said ends, said covers being adapted, upon closing, to engage said central reinforcing member, and when in open position to extend over the face of the side members and form upward extensions thereof.

3. A tool container comprising: a body; a central reinforcing sheet metal partition extending from end to end thereof; and covers pivoted to said body near the upper, outer corners of said ends by pin-and-slot connections, said covers being adapted, upon closing, to engage said central reinforcing member, and when in open position to extend over the face of the side members and form upward extensions thereof.

4. A tool container comprising: a body; a central reinforcing partition extending from end to end thereof; and covers pivoted to said body near the upper, outer corners of said ends by pin-and-slot connections, the edges of said covers being extended over the ends of said body and there provided with slots, said covers being adapted when in open position to extend over the side members and form upward extensions thereof.

5. A tool container comprising: a body; a central reinforcing partition extending from end to end thereof; and covers pivoted to said body near the upper, outer corners of said ends by pin-and-slot connections, the edges of said covers being extended over the ends of said body and there provided with slots engageable by pins on said ends, said covers being adapted, upon closing, to engage said central reinforcing member, and when in open position to extend over the face of the side members and form upward extensions thereof.

6. A tool container comprising: a body; a central reinforcing partition extending from end to end thereof; and covers pivoted to said body near the upper, outer corners of said ends and adapted to project into a channel extending longitudinally of said reinforcing elements.

In testimony whereof, I have hereunto set my hand at Los Angeles California, this 4th day of April 1925.

MAURICE J. McTIGHE.